United States Patent [19]

Seibel et al.

[11] Patent Number: 5,227,048
[45] Date of Patent: Jul. 13, 1993

[54] BACKWASHABLE FILTER DEVICE HAVING MEANS TO ADD ADDITIONAL FLUIDS TO FILTRATE BACKWASH FLUID

[75] Inventors: Heinrich Seibel, Hardthausen-Lampoldsheusen; Rudi Hermann, Heilbronn; Rudi Siller, Abstatt, all of Fed. Rep. of Germany

[73] Assignee: Intek Handels-GmbH fur Innovationstechnische Produkte, Ludwigshafen, Fed. Rep. of Germany

[21] Appl. No.: 727,426

[22] Filed: Jul. 9, 1991

[51] Int. Cl.⁵ .............................................. B01D 29/68
[52] U.S. Cl. ....................... 210/94; 210/107; 210/108; 210/110; 210/295; 210/410; 210/411; 210/418
[58] Field of Search ................ 210/94, 107, 108, 297, 210/304, 409, 411, 791, 797, 798, 109, 110, 198.1, 295, 410, 418, 420, 422

[56] References Cited

U.S. PATENT DOCUMENTS

| | | | |
|---|---|---|---|
| 1,826,361 | 10/1931 | McNeal | 210/398 |
| 2,183,577 | 12/1939 | McNeal | 210/107 |
| 2,310,587 | 2/1943 | MacNeil | 210/411 |
| 3,338,416 | 8/1967 | Barry | 210/411 |
| 3,363,771 | 1/1968 | Walters | 210/304 |
| 3,491,889 | 1/1970 | Walters | 210/411 |
| 3,493,112 | 2/1970 | Bradley | 210/107 |
| 3,826,368 | 7/1974 | Walters | 210/108 |
| 3,847,817 | 11/1974 | Jarman | 210/297 |
| 3,954,613 | 5/1976 | Worlidge | 210/108 |
| 4,059,518 | 11/1977 | Rishel | 210/108 |
| 4,297,209 | 10/1981 | DeVisser et al. | 210/108 |
| 4,549,961 | 10/1985 | Bellemann et al. | 210/108 |
| 5,128,029 | 7/1992 | Herrmann | 210/411 |
| 5,164,079 | 11/1992 | Klein | 210/411 |

FOREIGN PATENT DOCUMENTS

| | | |
|---|---|---|
| 4002290 | 8/1991 | Fed. Rep. of Germany . |
| 4333850 | 8/1930 | United Kingdom . |

*Primary Examiner*—Joseph W. Drodge
*Attorney, Agent, or Firm*—Herbert Dubno

[57] ABSTRACT

The invention concerns a backwashable filter device, specially for domestic water conduits that includes an inlet for raw water, a raw water chamber connected to the inlet, an outlet for clean water, a clean water chamber connected to the outlet, a filter element and an outlet for backwash water. The filter element is arranged between the raw water chamber and the clean water chamber and features a partial area (B) that accommodates water flow only in backwash but not normal operation. A conduit channel connects the outlet for backwash water with the partial area (B). At least one separate conduit connection is provided from the clean water chamber to the partial area (B). A conduit area is present in the conduit connection and designed in a nozzle-like shape so that clean water can be conducted from the clean water chamber at increased velocity against the partial area (B).

23 Claims, 4 Drawing Sheets

BACKWASHABLE FILTER DEVICE HAVING MEANS TO ADD ADDITIONAL FLUIDS TO FILTRATE BACKWASH FLUID

FIELD OF THE INVENTION

The invention refers to a backwashable filter device, as used especially in domestic water conduits.

The Related Art

Filter devices, which retain the impurities included in, and flowing with, the liquid and remove them thus from the liquid, are regularly incorporated in domestic water conduits and generally in water conduits. Over time impurities clog the inflow side of the filter. This has not only the disadvantage of reducing the efficiency of the filter, but causes also a pressure drop. The filter has to be cleaned therefore at shorter or longer intervals. In the initially mentioned backwashable filter devices, the cleaning process is made by flow reversal, the impurities removed from the filter surface during the cleaning process being discharged through a separate backwash channel together with the backwash water from the filter device.

A backwashable filter device of the initially mentioned type is known from EP-A-0121090. The filter element is of sleeve-type design. The backwash channel for the backwash water covers only a partial area of the filter element, so that the clean water can flow through this partial area of the filter element during the backwash process and sweep away the impurities deposited on the inner side of the filter surface. By shifting the backwash channel which ends on the inner side of the filter element over the entire surface of the filter, it is possible to sweep the whole filter surface and clean it accordingly. As the cleaning efficiency depends to a large extent on the flow velocity of the clean water against the filter surface to be cleaned, the water conduit pressure inside said filter device should be as high as possible, in order to ensure also at heavily contaminated filter an adequate suction effect for initiating and maintaining the cleaning process. The same applies also to the similarly operating filter device known from EP-A-0120988.

On the basis of this previously known state of the art, the basic aim of the invention is to provide a backwashable filter device of the initially mentioned type, which does not feature the disadvantages known from prior art and enables thus a high flow velocity of the backwash liquid also at relatively low pressures in mains.

SUMMARY OF THE INVENTION

According to the invention there is provided a backwashable filter device, specially for domestic water conduits, including an inlet for raw water, a raw water chamber connected to the inlet, an outlet for clean water, a clean water chamber connected to the outlet, a filter element and an outlet for backwash water. The filter element is arranged between the raw water chamber and clean water chamber. In connection with the filter element there is a partial area (B) which is ineffective in normal operation but functions exclusively for backwash operation. The outlet for backwash water is connected to the aforementioned partial area (B) by a conduit channel.

The invention in the initially mentioned backwashable filter device is accordingly characterized in that there exists at least one separate conduit connection from the clean water chamber to the in backwash operation effective partial area of the filter element, and that in this conduit connection a conduit zone is nozzle-like designed in such a manner that the clean water can be conveyed from the clean water chamber at increased velocity against the partial area of the filter element to be cleaned. This filter device ensures that the clean water can always flow at sufficient velocity against the filter surface to be cleaned, also at low line pressures. The cleaning process can be initiated thus unproblematically also at heavily contaminated filter surface, and maintained besides also at low line pressures.

The flow velocity of the clean water used for backwashing can be further increased by additionally directing at the same time a gaseous and/or liquid agent against the filter surface to be cleaned. This gaseous agent can be, for example, the outer air surrounding the filter device. The air introduced in the conduit channel increases on the whole the flow velocity of this water-air mixture.

According to a development of the invention it is also possible to introduce additionally a germicide in the backwash water. The filter surface can be cleared then not only of impurities in form of particles, but also of chemically or biologically harmful deposits. By closing the clean water discharge valve during this disinfection process it is possible to prevent an escape of the disinfectant through the clean water discharge valve into the domestic water conduit.

A cost-effective design of the above filter device results according to a development of the invention by a disk-shaped design of the filter element. The nozzle-like conduit channel can be arranged then in a fixed position in the filter device. By moving the filter surface past the nozzle-like conduit channel arranged in a fixed position in the filter device, it is thus possible to apply in a simple manner backwash water to the entire filter surface of the filter element and to clean the filter surface in this way.

In order to enable a sufficiently fine-meshed, and yet adequately deformation resistant design of the filter element, the filter disk rests according to a further feature of the invention on a support provided with openings, which is preferably arranged in a fixed position in the filter device. The filter disk slides then during its relative motion inside the filter device on the support.

With a fully clogged filter, that is, in a condition in which no raw water can flow anymore through the filter, and further with an open clean water outlet, there occurs in the extreme case a condition in which no clean water is available for the backwash process. In this condition, the partial area of the filter on the clean side of which the nozzle-like backwash channel sits, is clean. As soon as this partial area is moved out of the line of the backwash channel, that is, the filter disk is rotated through a certain number of angular degrees, this cleaned partial area of the filter area is available for the passage of raw water, so that clean water is also available for backwashing. Owing to the nozzle-like design of the backwash channel, this relatively small amount of clean water is sufficient for the backwash process.

Upon start of the backwash process, an extremely high pressure acts on the filter element as a result of the open clean water channel. This extremely high load can lead at highly fine-meshed filter disks to undesired high deformations of the disk, which can make it impossible in an extreme case to rotate the filter disk. In order to enable also in such cases an unproblematic rotation of the filter disk, an additional primary filter is arranged in the filter device according to a further feature of the invention. This primary filter makes it possible to bypass the filter disk acting as main filter, so that the pressure acting on the filter disk at the open clean water discharge valve can be reduced.

This primary filter is covered during normal operation by a sliding element, so that it cannot be clogged during normal operation by dirt particles and the like. This sliding element is removed only during the backwash process from the filter element, so that the raw water can flow through this primary filter into the clean water chamber and be used for backwashing.

According to a further feature of the invention, the motion of the sliding element and thus the operation of the primary filter can be automatically controlled. The motion of this sliding element can be automatically initiated by the varyingly high line pressures prevailing during the backwash process in the backwash device, contrary to the presures in normal operation. For this purpose, the raw water chamber is connected via a channel system to the backwash channel. The backwash discharge valve is open during the backwash process.

BRIEF DESCRIPTION OF THE DRAWING

The invention is described in detail in the following on the basis of the embodiments illustrated in the drawings. They show.

DETAILED DESCRIPTION

Figure 1:
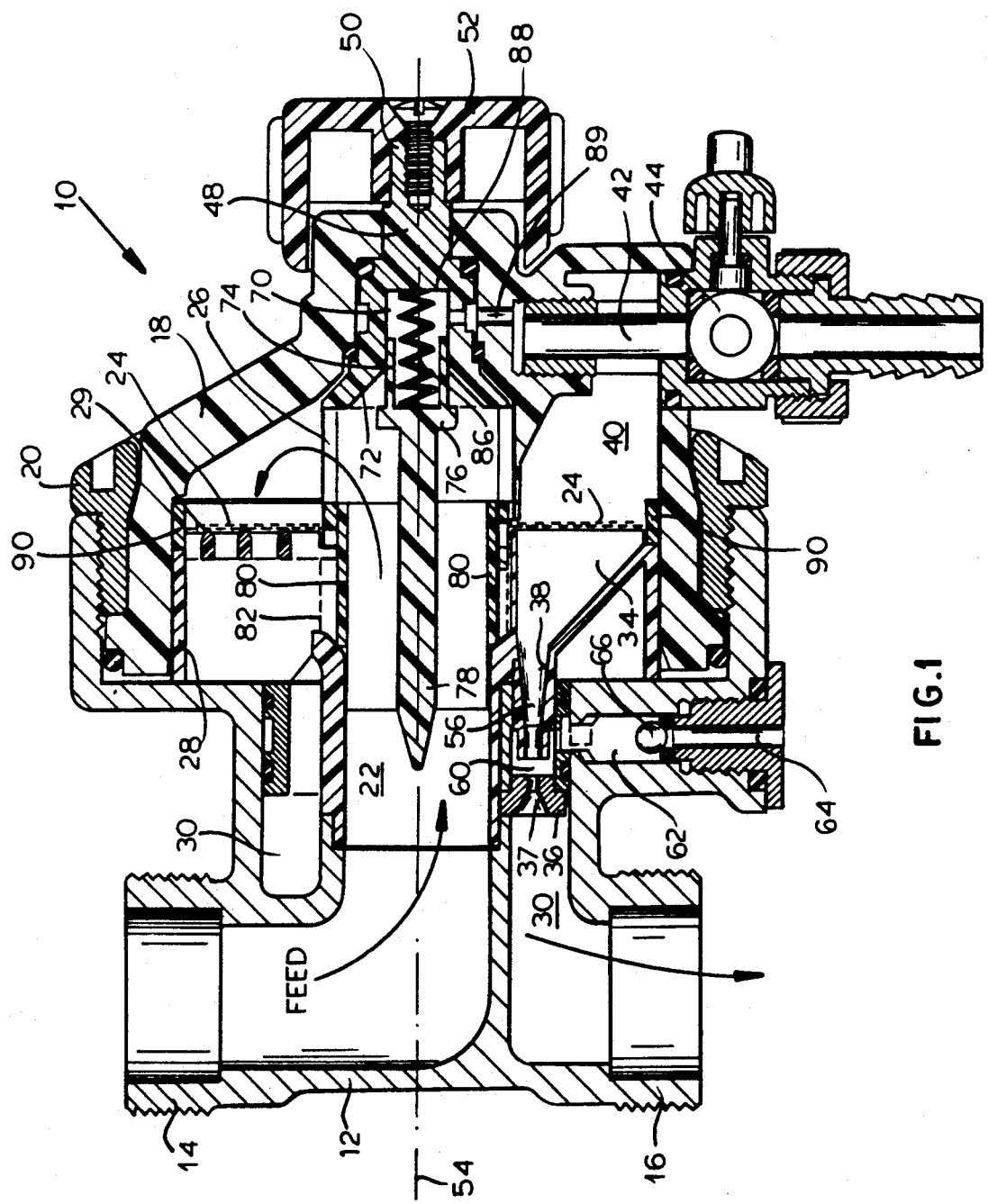
FIG. 1 a longitudinal section through a filter device of a first embodiment in normal operation, FIG. 2 a longitudinal section through the filter device according to FIG. 1 in backwash operation, FIG. 3 an explosive partial view of the filter element arranged according to FIGS. 1 and 2 in the filter device, with the support which carries the filter element and the outlined backwash channel system, and FIG. 4 a longitudinal section through a second embodiment, the left-hand half showing the normal operation, and the right-hand half the backwash operation.
Figure 2:
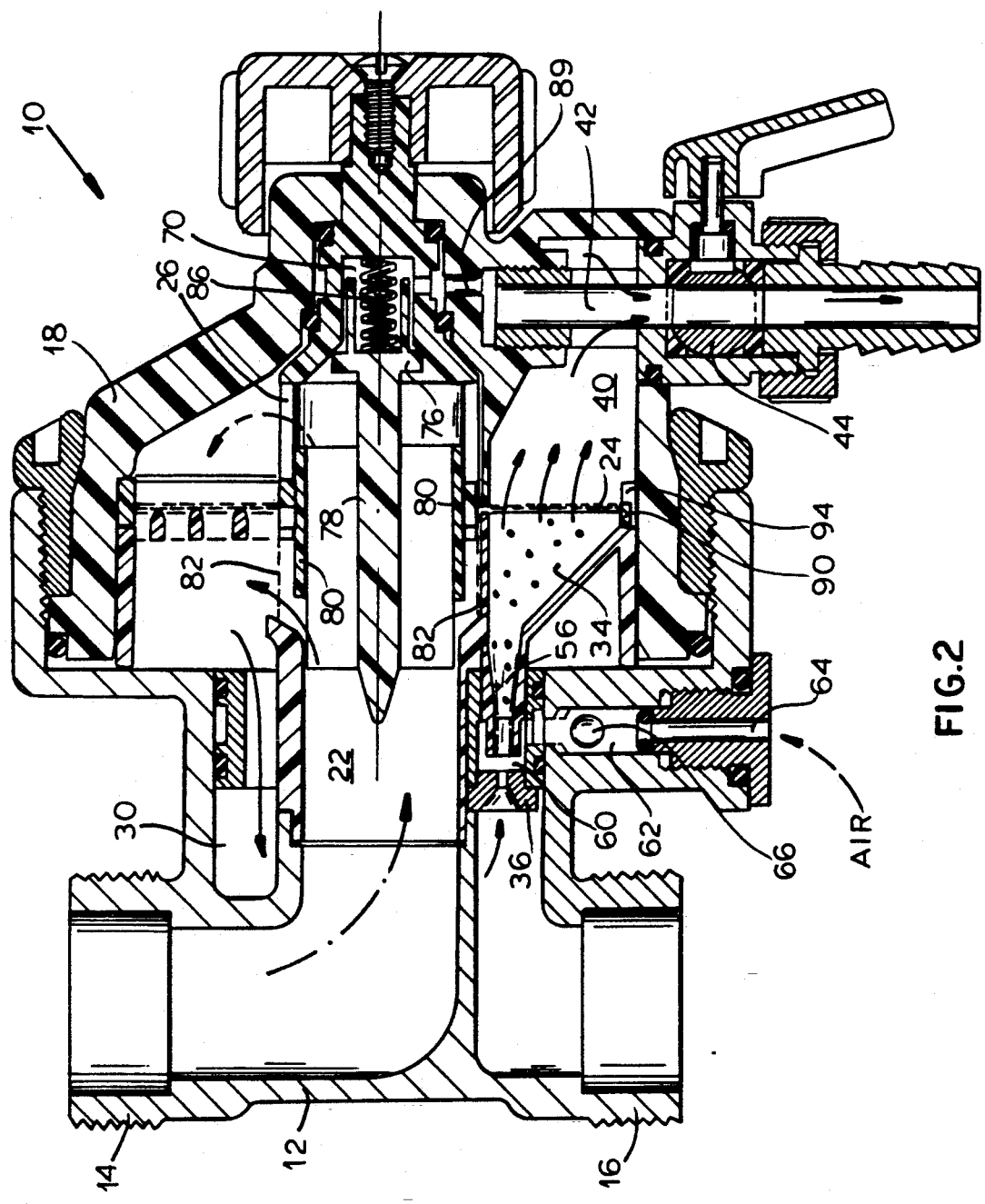
Figure 3:
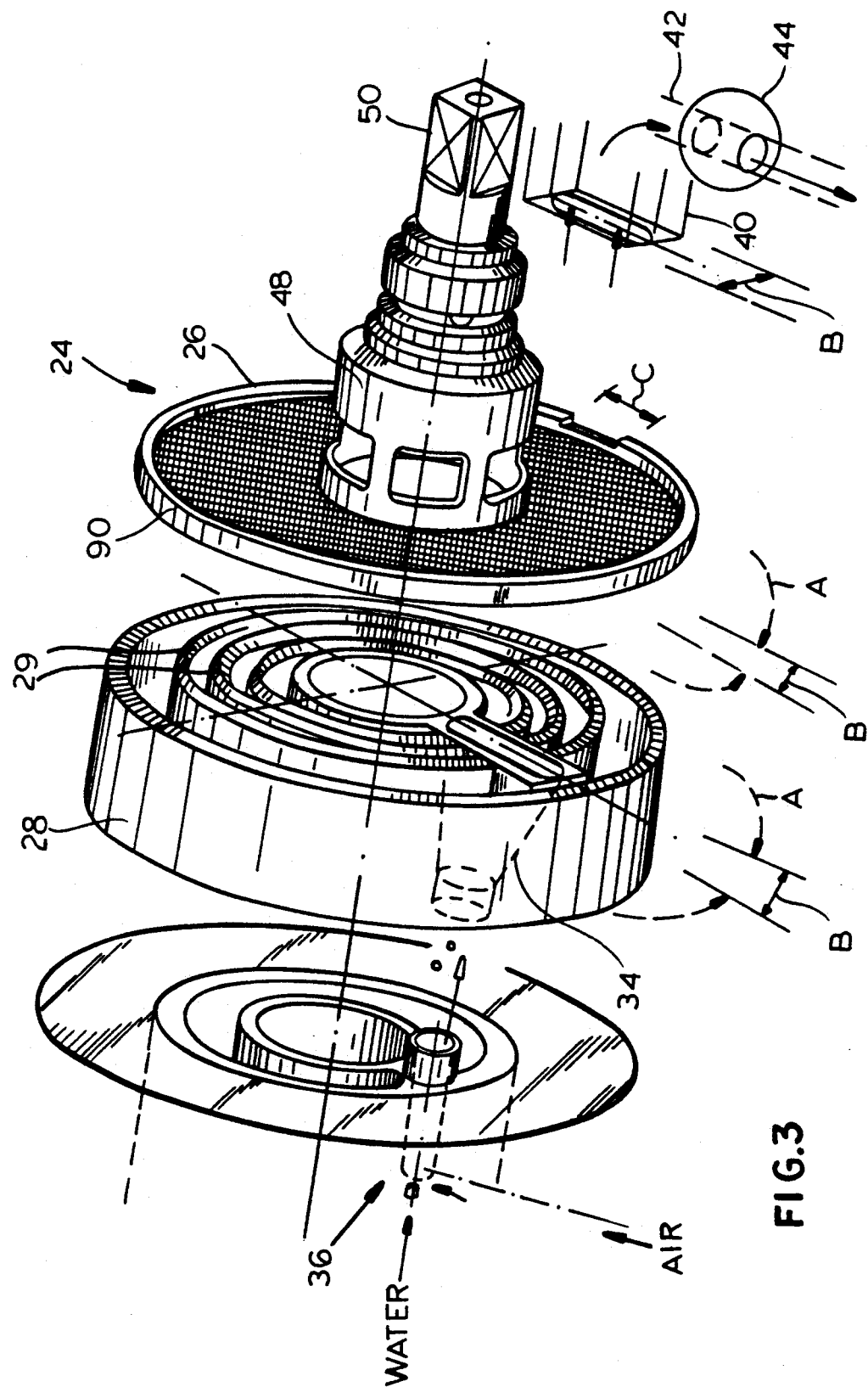

The filter device 10 shown in FIGS. 1 to 3 has a pipe connection part 12, which is connected with its two pipe connections 14, 16, to a not shown liquid line, e.g. a domestic water supply line.

The raw water enters through the top pipe connection shown in the drawing in the pipe connection part 12, flows then through the filter device, in which the impurities are removed, and is returned then as clean water through the bottom pipe connection shown in the drawing to the conduit system. This direction of flow is indicated by the arrow included in FIG. 1. In this operating condition, the filter device 10 operates in the so-called normal operation.

A casing part 18 is fastened by means of a clamping ring 20 to the pipe connection part 12. This clamping ring 20 is screwed to the pipe connection part 12 and presses the casing part 18 tightly and liquid-proof against said pipe connection part 12.

A raw water chamber 22 is centrically arranged in the casing part 18 and pipe-connected to the pipe connection 14. The raw water chamber 22 is surrounded by a filter element 24 designed as annular disk. The raw water chamber is provided with side openings 26, through which the raw water in the raw water chamber 22 can be diverted on the outside and flow—in FIG. 1—from right to left through the filter element 24.

The filter element 24, which consists of one or several layers of fine-meshed wire cloth, rests in flow direction on a support 28, which has a perforated surface 29 in its areas in contact with the filter element 24, so that the clean water which has passed through the filter element 24 can flow through the support 28.

The clean water flows from the area of the support 28 into an annular chamber 30, which is pipe-connected to the pipe connection 16.

This flow possibility beyond the filter element 24 takes place in an area A (FIG. 3) of the filter element 24, which covers almost all its surface. In the remaining area B (FIG. 3), no raw water can flow through the filter element 24 in normal operation, as a channel section 34 rests in this area B directly on the rear side of the filter element 24. This channel section represents the filter-side end of a nozzle 36, which leads with its conical inlet 37 into the annular chamber and with its end-side expanding area 38 into the channel section 34.

At the opposite side of the filter element 24, the channel section 34 is continued in a channel section 40, which discharges into a channel 42 leading out of the casing part 18. Channel 42 can be closed and opened by means of a ball valve 44. If the valve 44 is opened, clean water can flow from the annular chamber 30 through the nozzle 36 into the channel section 34, from there in area B through the filter element 24 and into the channel section 40, and be discharged via channel 42 from the filter device 10. This operating condition of the filter device refers to backwash operation, in which a partial area (area B) of the filter element 24 is always cleaned.

The filter element 24 sits transversally (right-angled) and coaxially on a shaft 48, which is provided in the area of the filter element 24 with holes, which represent the openings 26. The shaft 48 projects through the casing part 18 and has at its end a shaped end cross section 50, on which a handwheel 52 is screw-fastened. The shaft 48 together with the filter element 24 can be rotated by means of the handwheel 52 about the centric axis 54. The filter element 24 slides during this rotation along the support 28. At the same time, new areas of the filter surface always come during this rotation in the area B and thus in the area of the channel sections 34, 40, which are adjacent on both sides to the filter element, so that new surface areas of the filter element 24 can always be swept and cleaned by the backwash water.

In the nozzle 36, there is an annular gap 60 which surrounds the nozzle channel 56. A channel 62 leads transversally into this annular gap 60, which leads in turn into a channel 64, which leads from the filter device 10 to the outside. Channel 64 is sealed liquid- and gas-tight by a ball 66. The ball rests thereby due to its own weight and the pressure conditions prevailing during normal operation on the inside of the orifice of channel 64 (FIG. 1).

In backwash operation (FIG. 2), when clean water flows from the annular chamber 30 through the nozzle 36, there is a vacuum in the annular gap 60, which is effective also in the channel 62, so that the ball 66 moves upwards and releases thus the opening of the channel 64 (FIG. 2). Outer air can flow thus during the backwash process through the channels 64, 62, and the annular gap 60 into the nozzle channel 56 of the nozzle 36. This results in the formation of a water-air mixture in the nozzle channel, the flow velocity of which is higher than the flow velocity without air intake.

The raw water chamber 22 centrically arranged in the casing part 18 continues at its-in the drawing right-hand-end in a bag-like chamber 70. This chamber 70 is sealed at its opening 72 directed towards the raw water chamber 22 by a bushing, which projects with its cover part 76 into the raw water chamber 22. A rod-shaped sleeve core 78, which projects centrically into the raw water chamber 22, is fastened to this cover part 76. A sliding sleeve 80 is fastened to said sleeve core 78, which covers completely from the inside in the representation according to FIG. 1 a hollow cylindrical further filter 82 towards the raw water chamber 22, and incompletely in the representation according to FIG. 2. The different positions of the sliding sleeve 80 are effected by an axial displacement of the sliding sleeve 80, and thus by a corresponding displacement of the sleeve core 78 and thus of the bushing 74 in the direction of the axis 54. The bushing 74 is pressed away from the right-side rear wall 88 of the bag-like chamber 70 by a helical spring 86, as shown in FIG. 1 during normal operation.

Chamber 70 is connected through a further channel 89 with channel 42 which leads to the ball valve 44. The pressure prevailing in channel 42 is built up thus also in chamber 70.

In backwash operation, the pressure in chamber 70 is lower than in normal operation as a result of opening of the ball valve 44. This lower pressure in the chamber 70 pushes the sleeve core 78 and the bushing 74 rightwards into chamber 70, and this results in the compression of spring 86. This condition is shown in FIG. 2.

The closing of chamber 70 and the displacement of the sliding sleeve 80 rightwards to the position shown in FIG. 2 results in the partial uncovering of the hollow cylindrical filter 82 from the direction of the raw water chamber 22, so that the water can flow laterally from the raw water chamber 22 into the area of the support 28. The filter element 24 is thereby at least partially bypassed. In this way it is ensured that also when the filter element 24 is completely blinded by impurities, cleaned water is available in the annular chamber 30 and can be used for backwashing.

By sealing, for example, the channel 89 arranged between the channel 42 and the chamber 70 it is possible to achieve permanently constant pressure conditions in chamber 70, both in backwash operation and in normal operation. In this way it is possible to prevent an axial displacement of the sliding sleeve 80, so that the filter 82 cannot be used. As the filter 82 is required only under very rare extreme operating conditions, the service life of this filter 82 is exceptionally long, so that it is not necessary to clean this filter 82 for a period of several years.

The filter element 24 used in this example is provided on the inflow side with a fine-meshed, and on the outflow side with a wide-meshed metallic cloth network. Optionally large mesh structures can be naturally formed in this respect. It is also possible to apply only a single cloth layer on the filter element, and in return a second, wide-meshed layer on the support.

The pipe connection part 12 can be designed, moreover, for the connection of a pressure reducer or a water meter. The casing part 18 can be optionally adjusted by means of the clamping ring 20 with regard to the alignment of the pipe connection part 12.

In this example, the handwheel 52 is manually actuated, and the filter element 24 manually rotated in the casing part 18. The shaft 48 can be rotated evidently also by a motor. The rotary motion can be initiated at a preset maximum clogging degree of the filter element 24, and correspondingly stopped at a preset minimum clogging degree of the filter element. As a varyingly high pressure increase can be caused as a function of the clogging degree, the prevailing pressure can be used to control the rotary motion of the filter element 24. In addition to the rotary motion, the ball valve 44 has to be also opened, as only then it is possible to discharge the backwash water from the filter device 12 and to initiate thus the cleaning process.

The back-up ring 90 (FIG. 3), which surrounds the filter disk, features a one-sided notch 92 at one point. The length C of said notch 92 in the direction of the ring is greater than the dimension B. If the notch is located in the area of the channel section 40 (FIG. 2), the outer impurities close to channel section 40 can flow laterally through the openings 94 (FIG. 2), arranged on both sides of the channel wall, into the channel section 40, so that the impurity particles which have dropped from the surface of the filter element 24 as well as those located on the outside close to the channel section 40 can also be sucked during backwashing into the channel section 40, and removed through channel 42 from the filter device 10.

As raw water is also sucked into the channel section 40 together with the impurities from the areas arranged laterally close to the channel section 40, the notch 92 is not provided over the entire back-up ring 90, but only in a small area C. Liquid and impurity particles, which are located laterally close to the channel section 40, can be flushed out through channel 42 only when the area C of the filter element 24 is directed towards the channel section 40. The back-up ring 90 rests liquid-tight against the wall of channel section 40 in all the other rotational positions of the filter element 24, so that only backwash liquid can penetrate into channel section 40 through the filter element 24 in area B.

Figure 4:
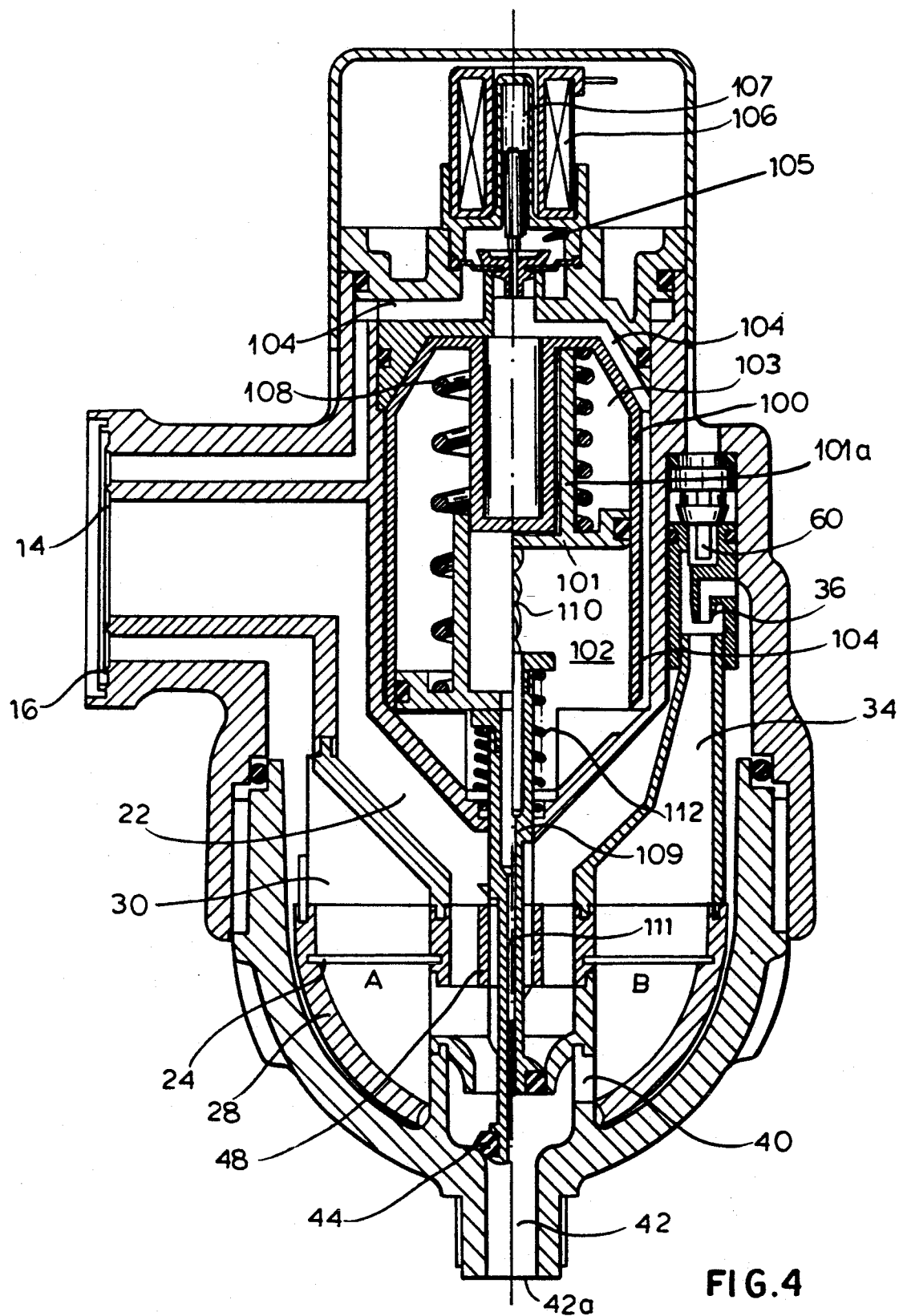

The embodiment illustrated in FIG. 4 corresponds in many parts to the first embodiment, so that similar or similarly operating parts have the same reference symbol:

The raw water flows through an inner pipe connection 14 into the raw water chamber below the filter element 24, in order to pass through the areas A of the filter element upwards into the clean water chamber 30. From there, the clean water flows outwards through the outer coaxial pipe connection 16. This normal operation is illustrated in the left-half of FIG. 4 and proceeds in the same manner as in the first embodiment. The valve 44 is thereby in the lower closed position, so that no water can be discharged through the dirt outlet 42a.

During this normal operation, the filter element areas marked A are covered with impurity particles and can be brought by rotation of the annular-shaped filter element 24 in the right-hand section of FIG. 4, which shows the backwash operation.

During backwash operation, clean water mixed with air flows through the injector nozzle 36 into the channel section 34, in order to pass through the filter element area B and to bring the dirt located on the filter element into channel section 40, and via the open valve 44 into channel section 42 to the dirt outlet 42a.

A cylinder 100 with and up-and-down moving piston 101 is arranged at the level of the pipe connections 14, 16, and the injector nozzle 36. The piston divides with its piston surface the cylinder 100 into a lower piston chamber 102 and an upper piston chamber 103. The lower piston chamber is connected through a conduit 104 with the clean water chamber 30 and the clean water outlet. A solenoid diaphragm valve 105 is arranged in the conduit 104, which can be operated electrically by a coil from a closed to an open position against the pressure of a spring 107.

If the valve 105 is opened, the piston 101 is lifted by the pressure of the clean water against the pressure of a compression spring 108, which is arranged in the upper piston chamber 103 coaxially on the piston shaft 101a. During its lift, the piston 101 drives upwards a coaxial valve stem 109 extending downwards, the lower end of which carries the actuator of valve 44. The lift of the piston 101 results thus in the opening of the valve 44.

A coaxial spindle 110 is mounted in the valve stem 109 in the upper area, which extends through the piston 101 and is rotated upon lifting of the piston 101 by said piston and/or by the spindle 110. The shaft 48 of the filter element 24 is fastened to the spindle 110, so that a rotation of the spindle 110 leads to a rotation of the coaxial shaft 88 and thus to a rotation of the coaxial filter element 24.

The filter device according to the second embodiment (FIG. 4) operates thus as follows:

During normal filter operation, the valve 44 is closed and the areas A of the filter element 24 filter the raw water to clean water. If the filter element 24 has to be cleaned by backwash, the solenoid valve 105 is opened by application of an electric voltage. Clean water flows then into the lower piston chamber 102 and the piston 101 is lifted, which results in the opening of valve 44 and the rotation of the filter element 24. On the further path of the piston the spindle together with the screen are rotated through 360 degrees in all, so that all the screen elements are cleaned. During this operation, a clean water-air mixture is pressed through the area B of the filter element 24, as described already for the first embodiment.

The valve 105 is subsequently closed, so that no further pressure is supplied via conduit 104 to the lower piston chamber 102. The pressure in the lower piston chamber 102 is reduced by conveying the water in the piston chamber 102 through a conduit 111 coaxially arranged in the valve stem 109 to the outlet 42a. This conduit 111 can be permanently open, as its cross section is smaller than the cross section of the conduit 104. The fact that some water flows continuously to the outlet 42a during the pressure decrease in the lower piston chamber 102 is thus insignificant, as the amount of water flowing in through the conduit 104 is always substantially higher.

Because of the decreasing pressure in the lower piston chamber 102, the piston 101 is rotated back to its initial position by the spring 108, the valve stem 109 being pushed downwards either directly by the piston 101 or, as in this embodiment, by a coaxial compression spring 112. This results in the closing of the valve 44, and the filter device is again in normal operation.

We claim:

1. A backwashable filter device comprising:
   an inlet for raw water;
   a raw water chamber connected to the inlet;
   a first downstream outlet for clean water;
   a clean water chamber connected to the first downstream outlet;
   a filter element for converting raw to clean water, the device being arranged to facilitate raw water flow generally from the raw water chamber across the filter element from a front to a rear surface thereof, the filter element being arranged between the raw water chamber and the clean water chamber, and the filter element featuring a partial area, the device being arranged for inhibiting flow from the raw water chamber through the partial area to the clean water chamber but permitting flow therethrough for backwash operation such that water flows across the partial area from the rear to the front surface thereof forming backwash water;
   a second downstream outlet for backwash water connected to the partial area by a conduit channel;
   at least one separate conduit connection provided from an inlet opening adjacent the clean water chamber to the partial area of the filter element;
   a conduit area in the conduit connection having a nozzle-like shape adapted to increase velocity of water passing therethrough; and
   a means including at least one separate inlet opening provided in the conduit connection for introducing a gaseous agent thereinto.

2. The filter device according to claim 1 wherein the gaseous agent is atmospheric air.

3. The filter device according to claim 2 further comprising a means for introducing a gaseous or liquid disinfectant into the conduit connection in addition to the atmospheric air.

4. The filter device according to claim 2 further comprising a valve associated with the at least one separate inlet opening for sealing same against inflow of the atmospheric air.

5. The filter device according to claim 4 wherein the valve automatically opens and closes, the valve being open in backwash operation to allow clean water flow through the conduit connection against the partial area of the filter element, and the valve being closed in normal operation.

6. The filter device according to claim 1 wherein the filter element is arranged to allow rotation and the nozzle-like conduit area is stationary within the filter device.

7. The filter device according to claim 6 wherein the filter element has an approximately plane filtering surface.

8. The filter device according to claim 7 further comprising a stationary support in the filter device whereupon the filtering surface can be movably mounted.

9. The filter device according to claim 1 further comprising a second filter element provided between the raw water chamber and an area downstream of the filter element, and a cover element provided for covering the second filter element against the raw water chamber.

10. The filter device according to claim 9 further comprising a spring means downstream from the inlet for raw water, the spring means being in communication with the cover element during backwash operation and functioning to shift the cover element at least partially away from the second filter element as a result of prevailing water pressure conditions.

11. The filter device according to claim 10 further comprising:
   a second raw water chamber connected through a first opening with the raw water chamber and through a second opening with the outlet for backwash water;
   a valve formed on the outlet for backwash water for sealing same; and a sliding element movable through the first opening and within the second raw water chamber, the spring means acting on the sliding element.

12. The filter device according to claim 1 further comprising a rotatable shaft to which vertically is attached a filtering surface of the filter element.

13. The filter device according to claim 12 further comprising a means for driving the shaft.

14. The filter device according to claim 12 further comprising a control means for rotating the shaft together with the filter element in such a manner that at a preset maximum flow resistance an outlet valve at the outlet for the backwash water opens and for stopping rotation of the shaft when water flow resistance decreases below a preset value closing the outlet valve.

15. The filter device according to claim 1 further comprising a casing formed of an optically transparent material, at least one of the front and rear surfaces of the filter element being at least partially visible through the casing.

16. The filter device according to claim 1 further comprising a means for measuring resistance to a current flow across the filter element.

17. The filter device according to claim 1 further comprising a cylinder and piston therein downstream from the inlet for raw water, the piston being movable by water pressure and resting in a first position while opening in a second position a valve means for conducting the backwash water to the outlet for the backwash water.

18. The filter device according to claim 17 further comprising a means for controlling the water pressure which moves the piston, the means for controlling being an electric valve.

19. The filter device according to claim 17 further comprising a spring means in contact with the piston for returning the piston to the first position after decrease of the water pressure from a higher pressure that shifts the piston to the second position.

20. The filter device according to claim 17 further comprising a valve stem connected to the piston and which actuates the valve.

21. The filter device according to claim 20 further comprising a spindle connected to the piston, the piston rotating the spindle during motion from the first to the second position, the spindle being in communication with the filter element and transmitting rotation thereto.

22. The filter device according to claim 21 wherein the piston, spindle and valve stem are coaxially arranged.

23. The filter device according to claim 20 wherein the valve stem connects via an inner longitudinal hollow space a pressure side of the piston with the outlet for backwash water.

* * * * *